(12) United States Patent
Oldiges

(10) Patent No.: US 10,859,134 B2
(45) Date of Patent: Dec. 8, 2020

(54) ROPE GRIPPER

(71) Applicant: David Oldiges, Crystal River, FL (US)

(72) Inventor: David Oldiges, Crystal River, FL (US)

( * ) Notice: Subject to any disclaimer, the term of this patent is extended or adjusted under 35 U.S.C. 154(b) by 0 days.

(21) Appl. No.: 15/998,822

(22) Filed: Aug. 16, 2018

(65) Prior Publication Data
US 2019/0376580 A1    Dec. 12, 2019

Related U.S. Application Data

(60) Provisional application No. 62/682,160, filed on Jun. 7, 2018.

(51) Int. Cl.
*F16G 11/00* (2006.01)
*F16G 11/04* (2006.01)

(52) U.S. Cl.
CPC ................. *F16G 11/046* (2013.01)

(58) Field of Classification Search
CPC ........ F16G 11/106; B63B 11/04; B63B 21/04
USPC ............. 24/132 R, 132 WL; 114/218; 182/5, 182/192, 193; 188/2 D, 65.1–65.5, 265; 254/334, 342, 369
See application file for complete search history.

(56) References Cited

U.S. PATENT DOCUMENTS

| | | | |
|---|---|---|---|
| 4,716,630 A * | 1/1988 | Skyba | F16G 11/106 24/134 KB |
| 5,133,111 A * | 7/1992 | Brown | F16G 11/106 24/132 WL |
| 5,348,116 A * | 9/1994 | Pickering | A62B 1/14 182/192 |
| 5,932,112 A * | 8/1999 | Browning, Jr. | B63B 11/04 210/750 |
| 6,381,816 B1 | 5/2002 | Lai | |
| 6,505,384 B1 * | 1/2003 | Renton | B63B 21/04 114/218 |
| 6,506,384 B1 | 1/2003 | Renton | |
| 7,222,840 B1 | 5/2007 | Stepper | |
| 9,631,698 B2 | 4/2017 | Gupta | |
| 9,884,209 B2 | 2/2018 | Hwang | |
| 2012/0012689 A1 | 1/2012 | Alden | |
| 2013/0220200 A1 * | 8/2013 | Juenger | B63B 21/04 114/218 |
| 2016/0258457 A1 | 3/2016 | Moine | |
| 2016/0377150 A1 * | 12/2016 | Simonson | F16G 11/106 24/68 A |

* cited by examiner

*Primary Examiner* — Christopher P Schwartz
(74) *Attorney, Agent, or Firm* — Muskin and Farmer LLC

(57) ABSTRACT

A rope gripping apparatus and methods for its use. The rope gripper has a spring acting on a cam which causes the cam to rotate about a fixed point from an open position to a closed position. When a rope is present in the apparatus the cam will contact and grip the rope when pulled in one direction, yet let the rope slide freely when pushed in the opposite direction. The cam can easily be opened for loading the rope by pressing the cam's thumb lever or by simply sliding the apparatus' channel opening and the cam against a taut rope. The cam can have two separate gripping profiles (teeth) on the peripheral edges to effectively grip a variety of rope diameters. The cam also has a retaining ridge built in which acts as a retaining wall to keep the rope retained inside of the channel during operation.

16 Claims, 27 Drawing Sheets

ROPE GRIPPER

CROSS REFERENCE TO RELATED APPLICATIONS

This application claims benefit to U.S. application 62/682,160, which is incorporated by reference herein in its entirety.

BACKGROUND OF THE INVENTION

Field of the Invention

The present general inventive concept is directed to a method, apparatus, and computer readable storage medium directed to a rope gripper and methods for its use.

Description of the Related Art

Cam cleat devices have long been used to grip ropes, lines, or the like hereafter referred to as rope. In many situations that involve gripping and pulling a rope, one's bare hands do not provide enough grip and/or leverage to pull a tensile load (due to slippery ropes, size of ropes, excessive loads, or arthritic or weak hands) and are thus prone to slipping which can lead to injury such as rope burn. Sailing for example, requires various ropes be handled in order to raise and/or manipulate sails where the forces can be substantial. Gloves may alleviate the rope burn aspect, but do not provide more pulling leverage than one's hands alone can generate.

A broad range of cleat devices have been developed for gripping ropes using a rotational cam and a gripping surface, but in many of these either the rope is not easily introduced into the device because the rope needs to be threaded through an orifice or manipulated through a channel, or the cam itself needs to be manually opened or unpinned to allow the insertion of rope. Another drawback with existing cam/cleat designs is that the easier is to load the rope, the easier it is for the rope to inadvertently become dislodged. Existing designs usually have a separate cover member, lever, or pin that needs to be engaged to retain the rope inside of an operating channel making the loading process more difficult.

Therefore, there is a need for an improved cam cleat device which overcomes these problems.

SUMMARY OF THE INVENTION

It is an aspect of the present invention to provide an improved rope gripping device.

This together with other aspects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
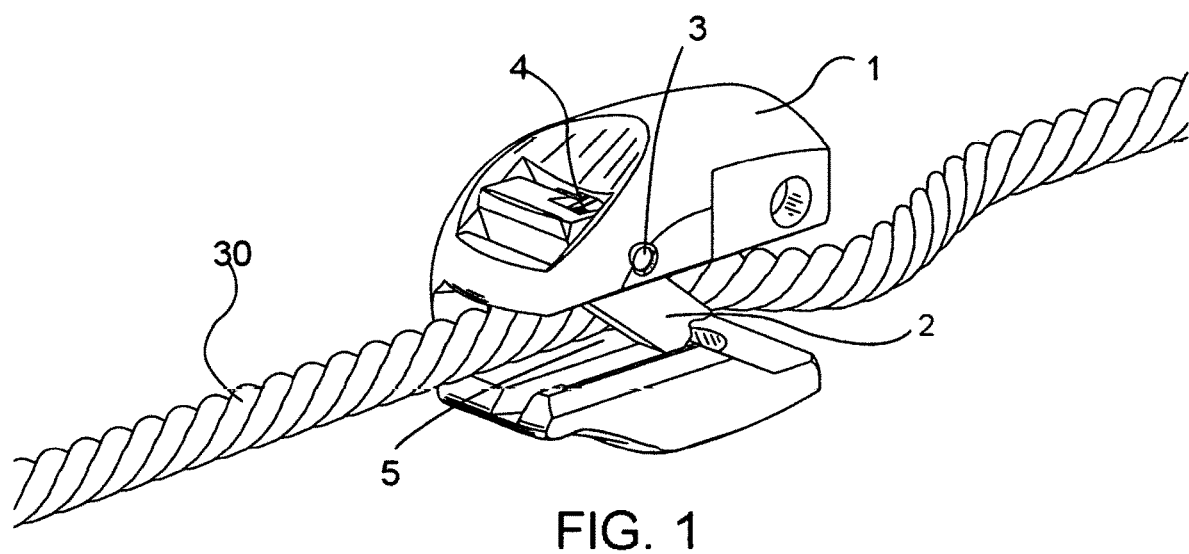
FIG. 1 is a perspective view illustrating the rope being retained laterally in the main gripping channel by the cam's integrated retaining ridge, according to an embodiment.

Reference will now be made in detail to the presently preferred embodiments of the invention, examples of which are illustrated in the accompanying drawings, wherein like reference numerals refer to like elements throughout.

In an embodiment, an ergonomical handheld rope gripper (device) can be used to grip a rope and gain a mechanical advantage when manually exerting a tensile force on the rope that with minimal effort can quickly be employed at any position along the rope, without the need to manually thread or manipulate the rope through an orifice or channel. Furthermore, once the rope is positioned inside the gripping channel, the cam can rotate via force from the spring and thereby grip the rope against the bottom of the gripping channel. The unique earn design with integrated retaining ridge will rotate down and automatically act to keep the rope securely retained in the channel and co-planar to the cam's gripping teeth. Teeth (primary gripping teeth or secondary gripping teeth) can be a plurality of protrusions which are typically sharp. Teeth can also include a very rough surface such as sandpaper. The rope gripper grips the rope in one direction as it is pulled yet allows the rope to slide freely through the device in the opposite direction.

The device (rope gripper) can also be used as a cam/cleat device to hang objects from using gravity as the pulling force (such as a boat fender, etc.) and thereby have an easy mechanism to adjust objects vertically along the rope.

A rope gripper of an embodiment comprises a body 1 shaped in a spherical, cylindrical, oval or other ergonomical shape which can be held comfortably in the palm of a user's hand. As shown in FIG. 1, a longitudinal gripping channel 5 is open on three sides and runs the length of the body 1 permitting a rope 30 to pass through. The rope gripper also comprises a torsion spring 4 connected to a cam 2 pivotally connected to the body 1 via a fixed shaft (dowel pin 3) which in combination creates a gripping function which will be subsequently described in greater detail.

Figure 2:
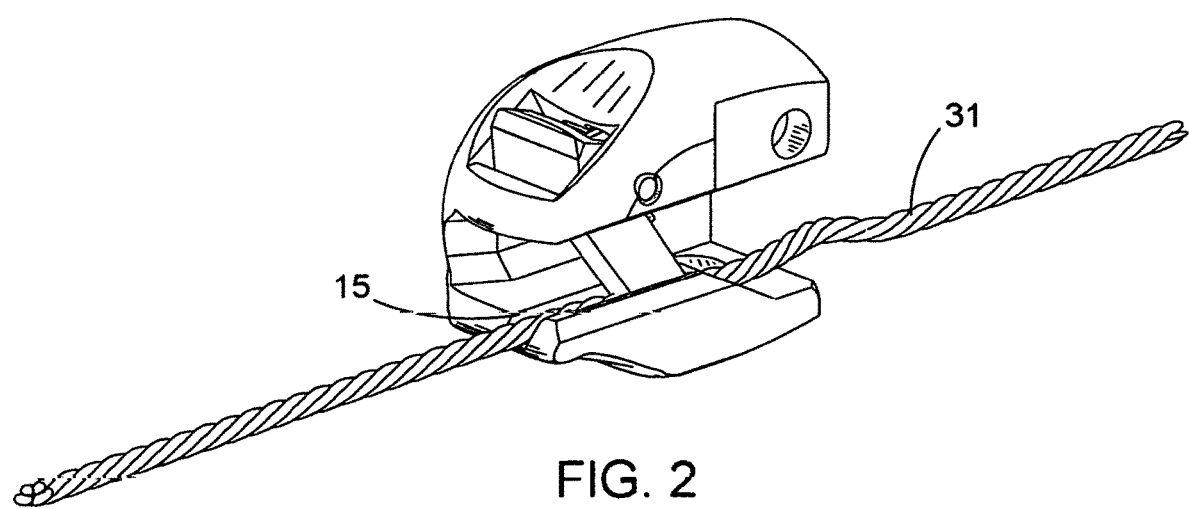
FIG. 2 is a perspective view illustrating the cam's secondary teeth gripping a small diameter rope in the retention groove, according to an embodiment.

As an alternative, a small diameter rope 31 (which is smaller in diameter than the rope 30) can also be gripped separately in the rope gripper, as shown in FIG. 2. The cam 2 can also grip the smaller diameter rope 31 in the retention groove 15 (the cam's secondary gripping teeth 7 can press down and grip the smaller diameter rope 31). Either rope 30, 31 can be any length (e.g., 1 to 100 feet or more).

Figure 3:
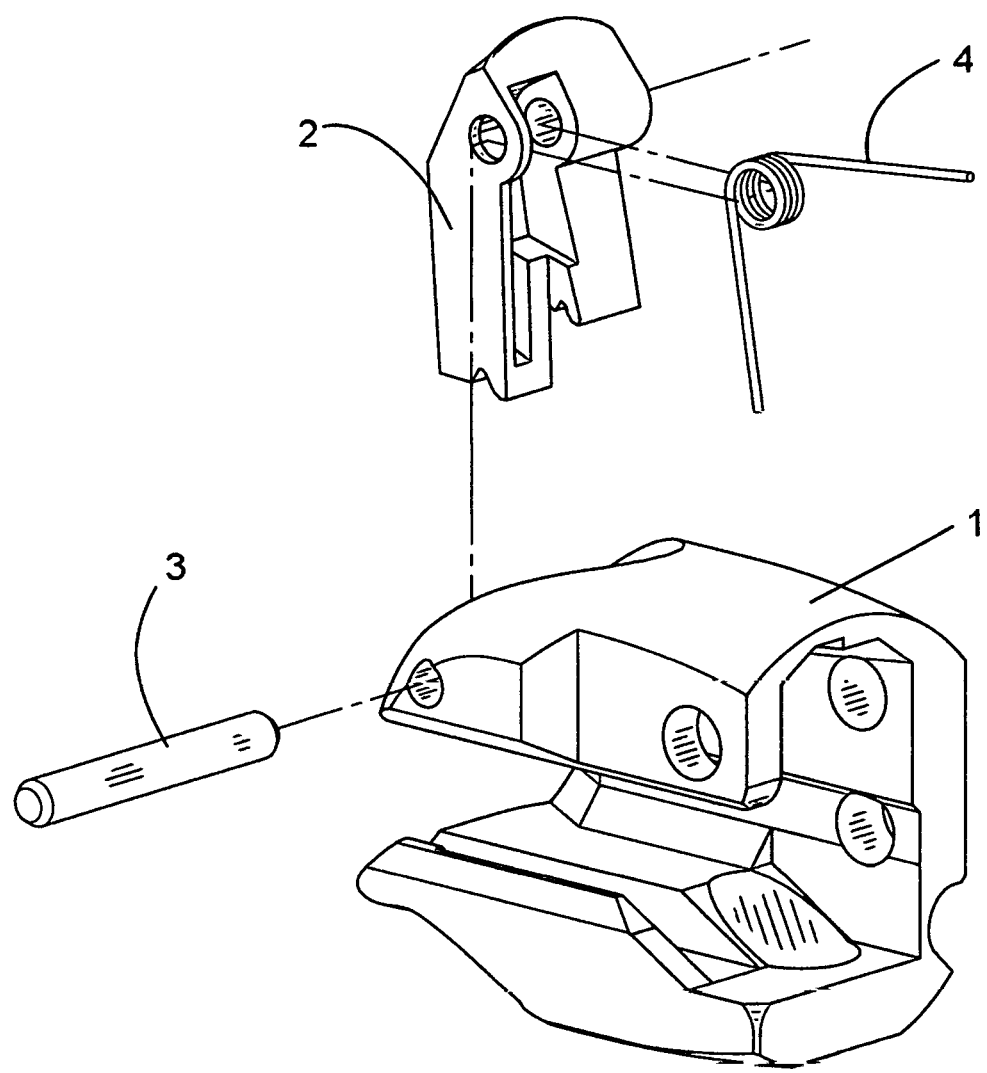
FIG. 3 is an exploded perspective view illustrating the four components: body, dowel pin, cam, and the spring, according to an embodiment.
Figure 6:
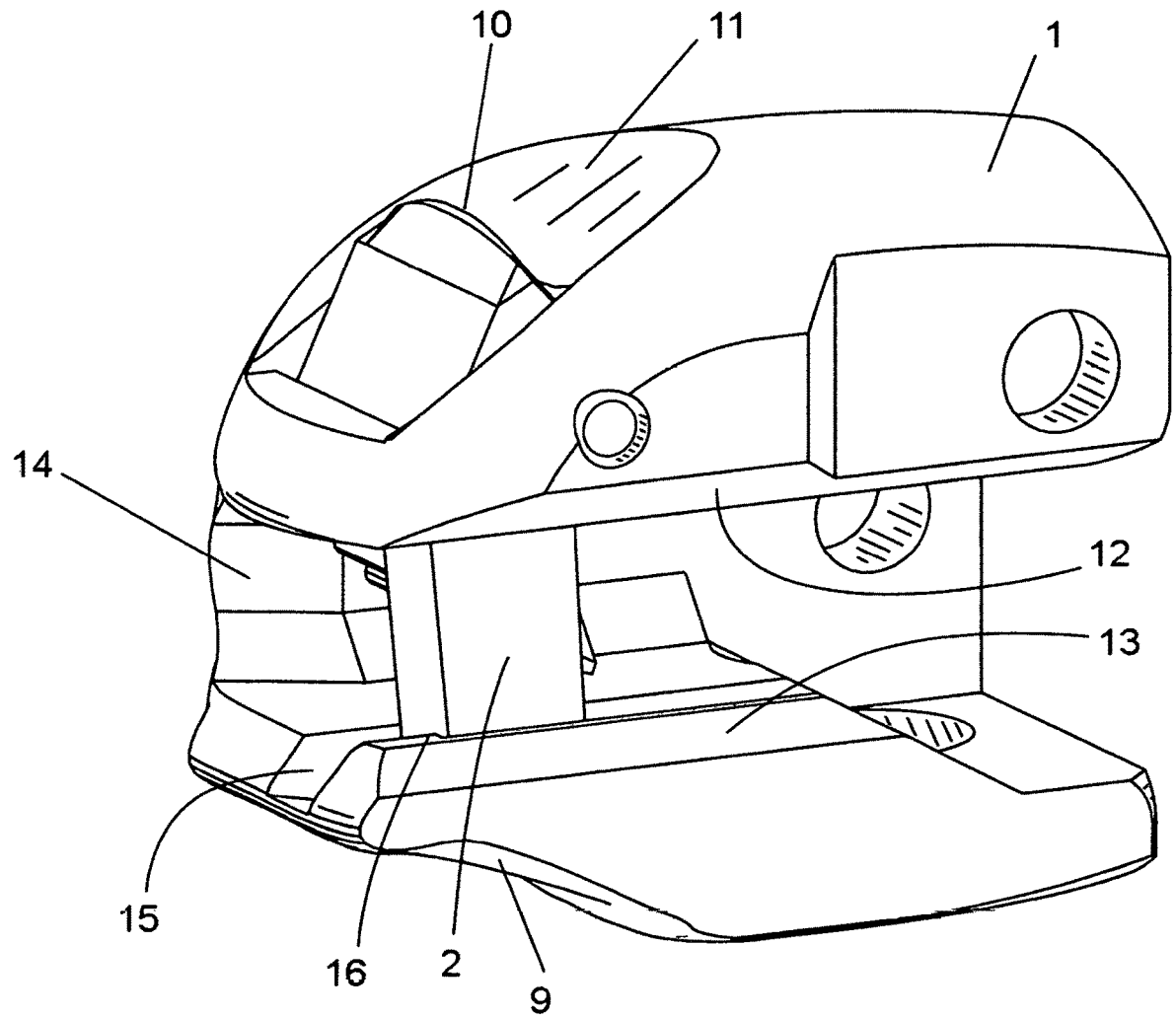
FIG. 6 is a front-side perspective view illustrating the cam in the closed position against the cam stop, according to an embodiment.
Figure 8A:
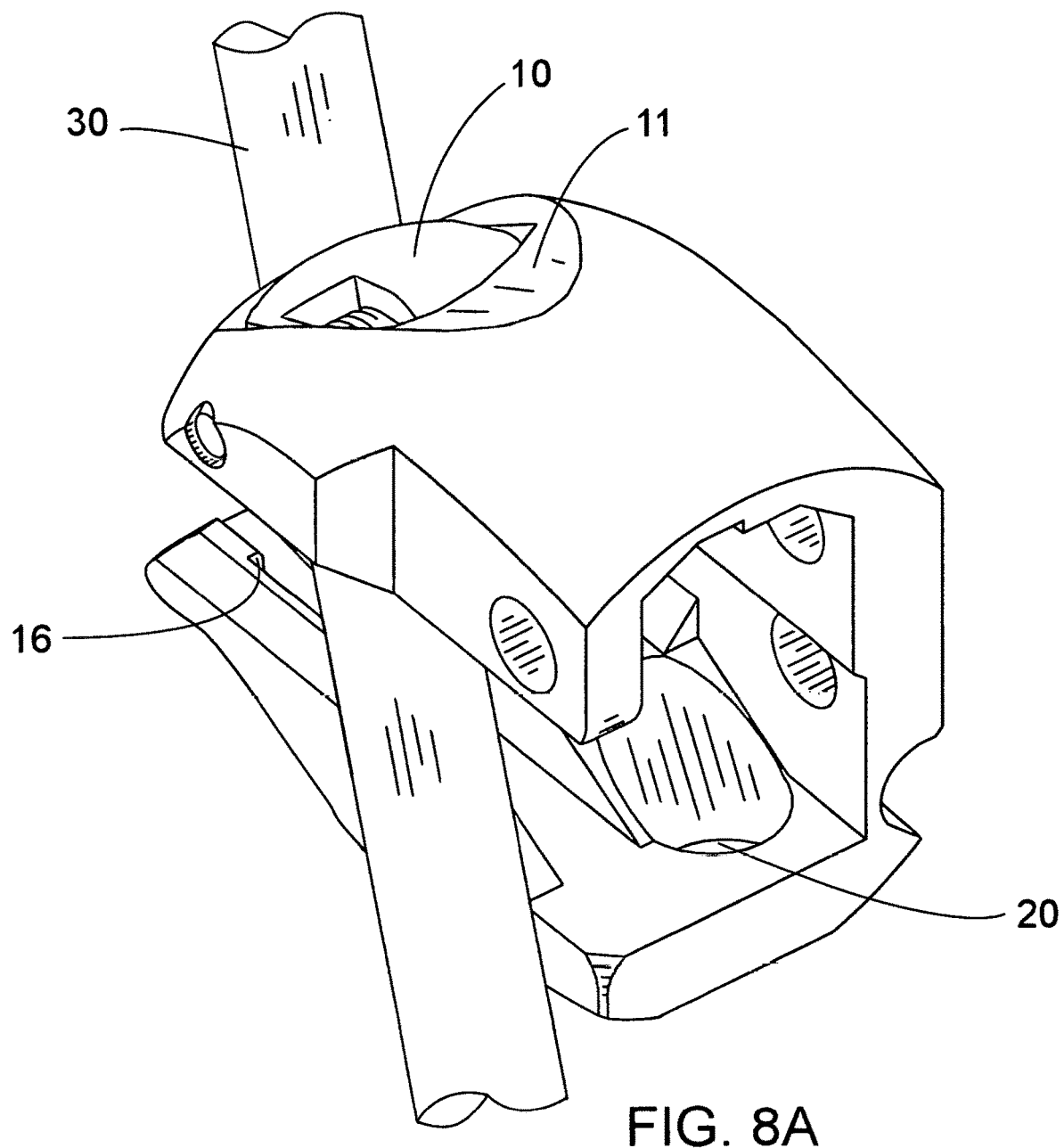
FIG. 8A is a top perspective view illustrating the rope angled against the cam as initiated during the loading process, according to an embodiment.
Figure 8B:
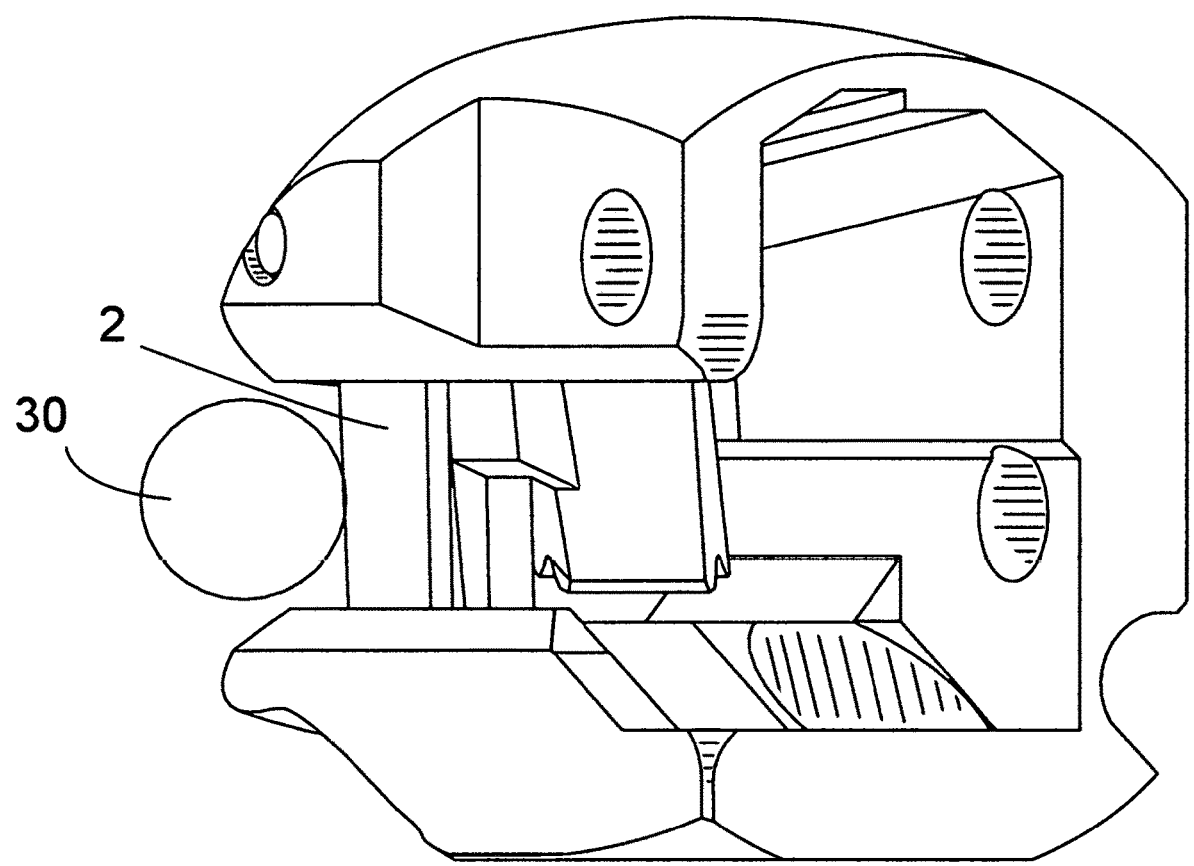
FIG. 8B is a perspective view illustrating the initial step in the loading a rope into the rope gripper without using the thumb lever, according to an embodiment.
Figure 8C:
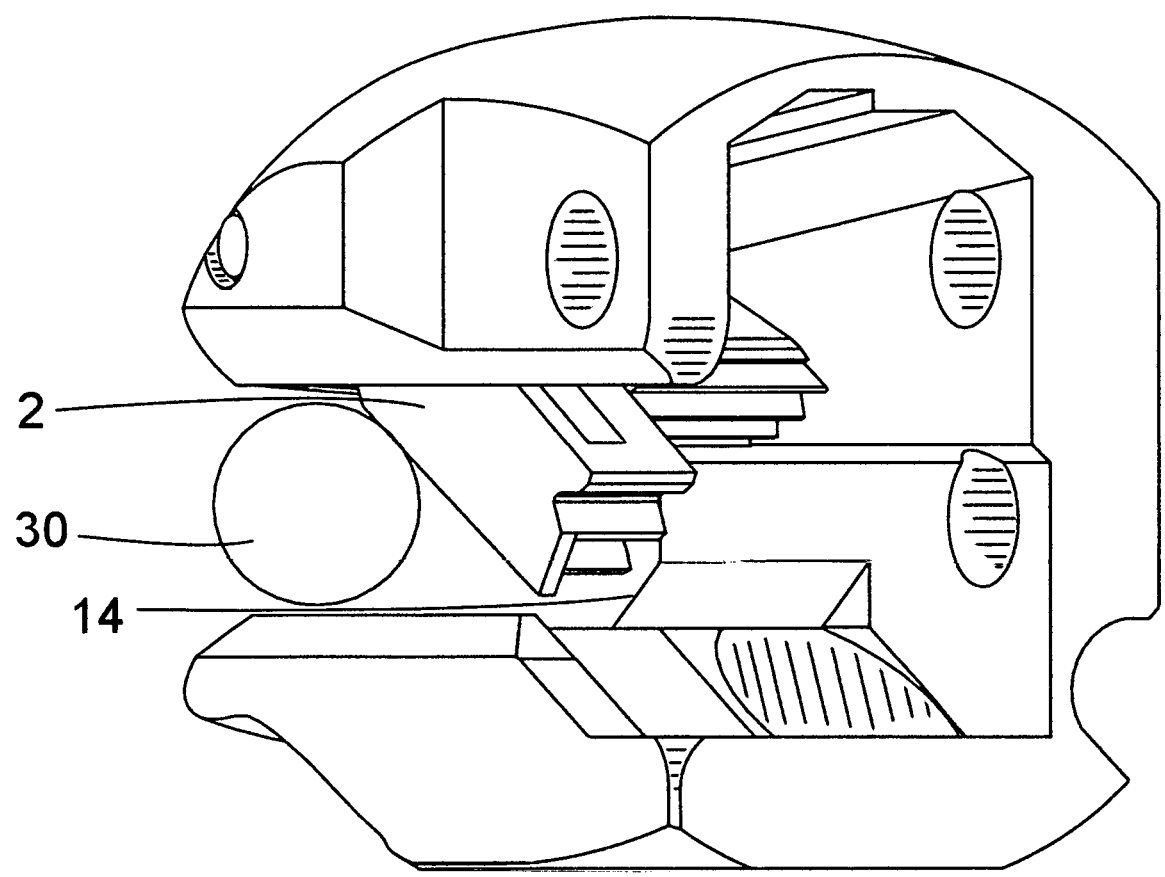
FIG. 8C is a perspective view of an intermediate step in loading the rope into the rope gripper without using the thumb lever, according to an embodiment.
Figure 8D:
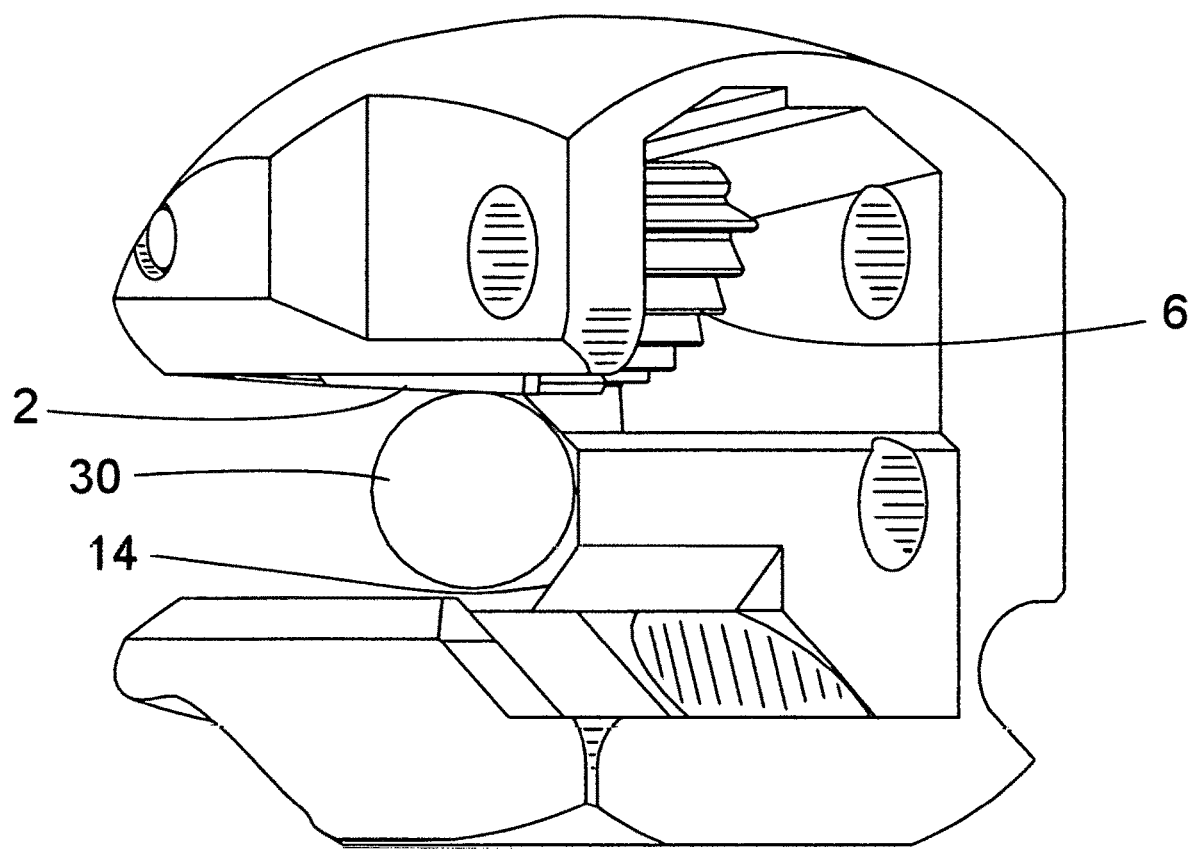
FIG. 8D is a perspective view of a further intermediate step in loading the rope into the rope gripper without using the thumb lever, according to an embodiment.
Figure 8E:
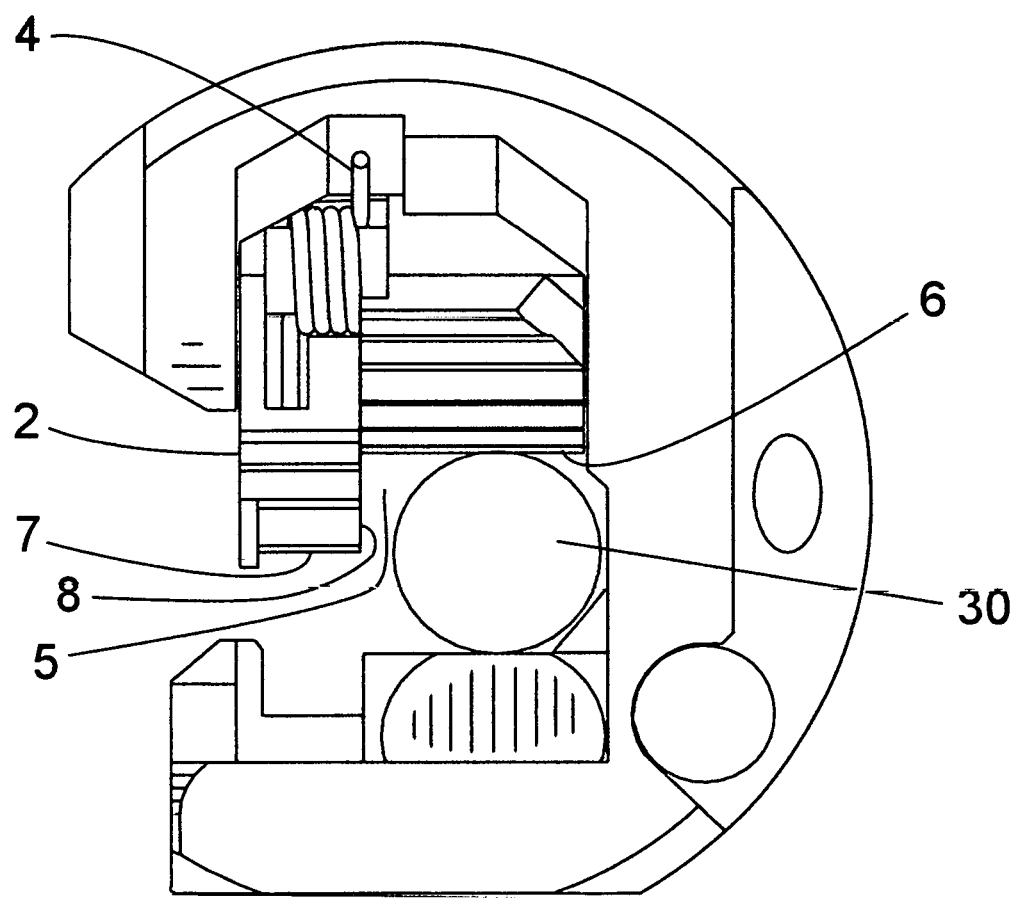
FIG. 8E is a rear perspective view of the rope after it is loaded and secured inside the rope gripper, according to an embodiment.

The torsion spring 4 as shown in FIG. 3 fits into a cutout in the cam 2 with one leg of the torsion spring 4 pressing inside the cutout (although the cutout is optional and the torsion spring 4 can simply press against a surface on the cam 2 as well) and the other leg pressing against the inside ceiling of the body 1 as shown in FIG. 8E. A dowel pin 3 passes through a first hole in the body 1 and then a first hole in the cam 2 and then a hole in the torsion spring 4 and then a second hole in the cam 2 and then a second hole in the body 1. This assembly allows the cam 2 to rotate within the body 1. The arrangement of parts results in the torsion spring 4 naturally causing the cam 2 to be urged toward the closed position (shown in FIG. 4A.) When no rope 30, 31 is present in the gripping channel 5 or the retention groove 15, the cam 2 can be fully rotated into the closed position and rests against the cam stop 16 as shown in FIG. 6. If a rope 30, 31 is present in the gripping channel 5 or the retention groove 15, then the cam's gripping action on the rope 30, 31 would prevent the cam 2 from being fully rotated into the closed position.

Figure 4A:
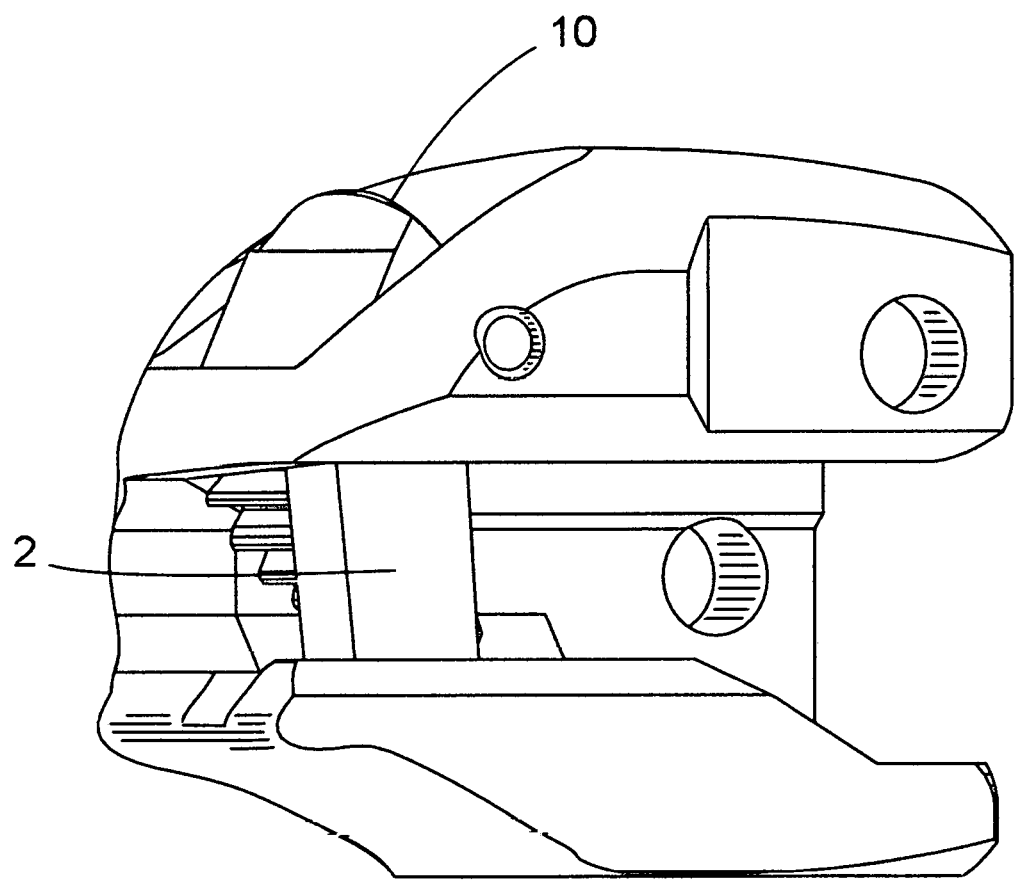
FIG. 4A is a perspective view illustrating the cam in a closed position, according to an embodiment.
Figure 4B:
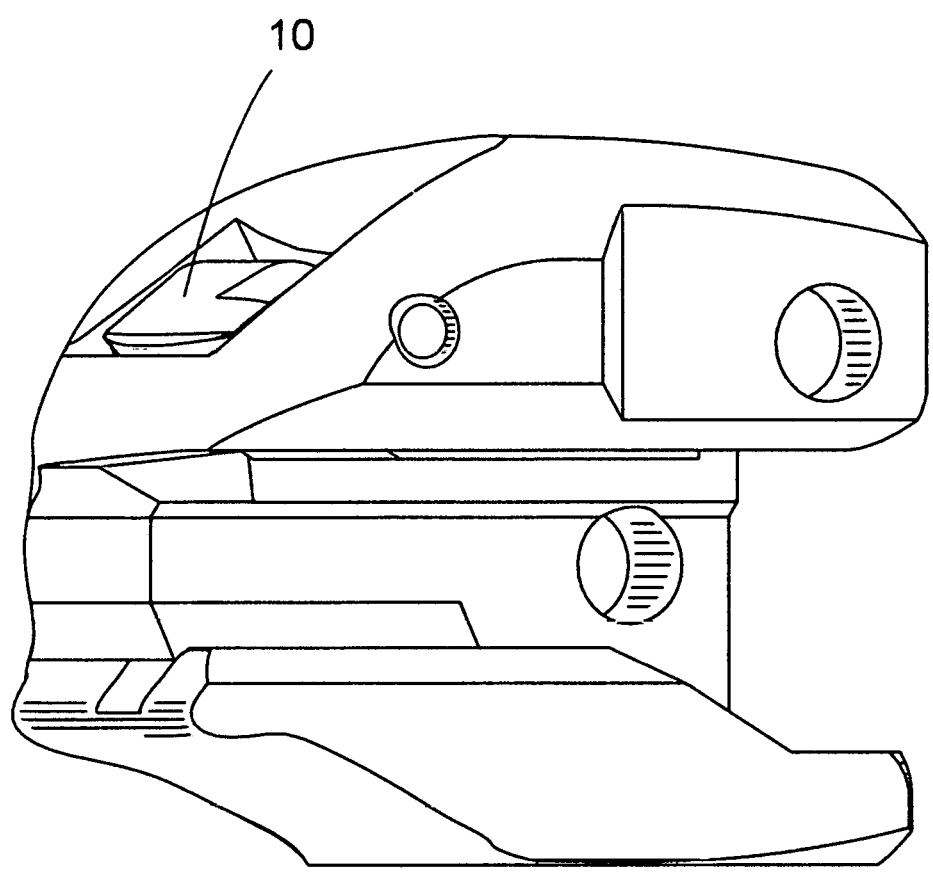
FIG. 4B is a perspective view illustrating the cam in an open (loading) position, according to an embodiment.

A user can press the thumb lever 10 on the cam 2 which counteracts (opposes) the force of the spring 4 and causes the cam 2 to rotate toward the open (loading) position (in an opposite direction that the spring 4 naturally causes the cam 2 to rotate) as shown in FIG. 4B. When the user releases pressure on the thumb lever 10 (e.g., by removing his/her thumb), the cam 2 would naturally revert (by force of the torsion spring 4) from the open (loading) position into the closed position and rest against the cam stop 16 as shown in FIG. 6. If a rope 30, 31 is present inside the rope gripper, then the cam's gripping action on the rope 30, 31 can prevent the cam 2 from fully closing into the closed position and instead the cam 2 may stop in an intermediate position. It is noted that in the alternative to the thumb lever 10, any other type of lever can be used as well.

Figure 4C:
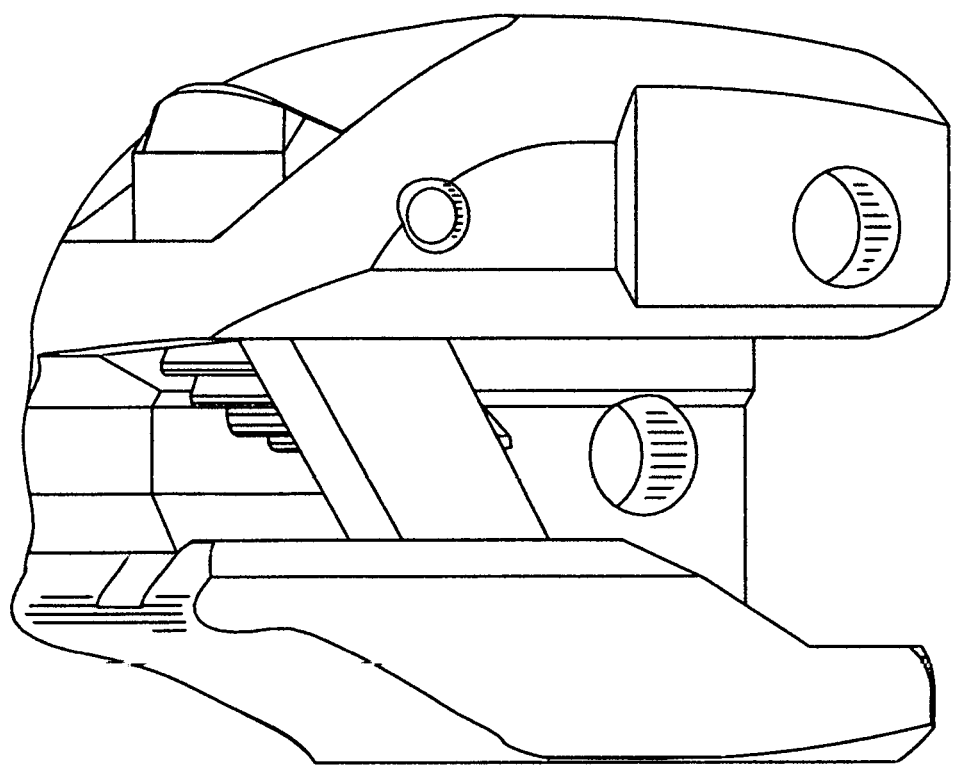
FIG. 4C is a perspective view illustrating the cam in an intermediate position (between the open and closed positions), according to an embodiment.

In between the closed position (shown in FIG. 4A) and the open (loading) position (shown in FIG. 4B) is an intermediate position, shown in FIG. 4C. There are many intermediate positions between the open (loading) position and the closed position. An intermediate position may result from the cam 2 rotating open or closed, if there is a rope 30, 31 present and the cam 2 rotates towards the closed position, the cam 2 would contact and grip the rope 30, 31 (the primary gripping teeth 6 would contact and grip the rope 30 in gripping channel 5, or the secondary gripping teeth 7 would contact and grip the rope 31 in the retaining groove) which can prevent the cam 2 from rotating into the fully closed position.

Figure 5A:
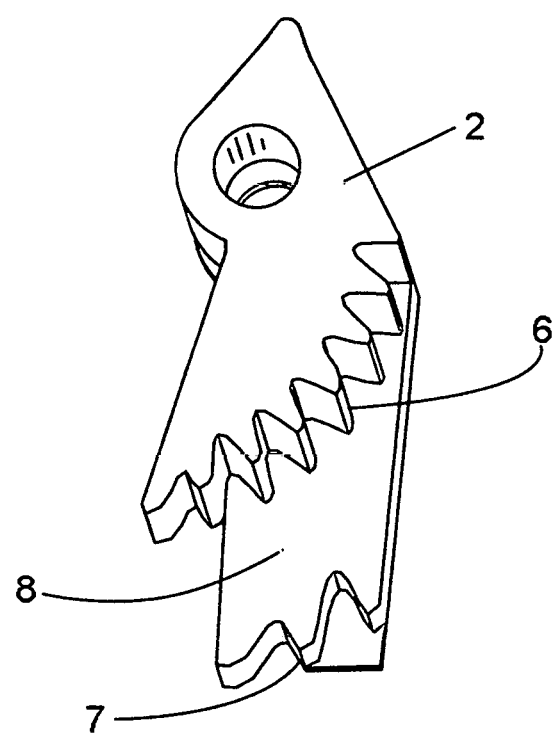
FIG. 5A is a perspective view illustrating the cam, it's retaining ridge, and the primary and secondary gripping profiles, according to an embodiment.

When a rope 30 is introduced into the gripping channel 5, the natural force of the spring 4 forces the cam 2, to rotate around a dowel pin 3 towards the closed position, enabling the cam's primary gripping teeth 6 (which are on a curved periphery as shown in FIG. 5A) to contact the rope 30 and pinch it against the gripping channel's 5 bottom surface. As the user pulls the rope gripper away from the tensile load (backward stroke), the eccentric profile of the primary gripping teeth 6 relative to its pivot arc causes the teeth to "bite" further into the rope 30. In effect, the cam 2 grips the rope 30 tighter as additional pulling pressure is applied. As the cam 2 rotates toward the fully closed position (due to force of the spring 4 and/or the mechanical force that the rope 30 exerts on the cam 2), the mechanical cam stop 16 can eventually stop (block) the cam 2 from rotating and keep the cam 2/rope 30 contact point from moving beyond a horizontal center point of the dowel pin which would cause a locked jaw. The cam stop 16 is a fixed Hock or other solid piece, which, in this embodiment, is located in the retention groove 15, (but can be located anywhere on the body to prevent the cam 2/rope 30 contact point from moving beyond a horizontal center point of the dowel pin 3).

Figure 5B:
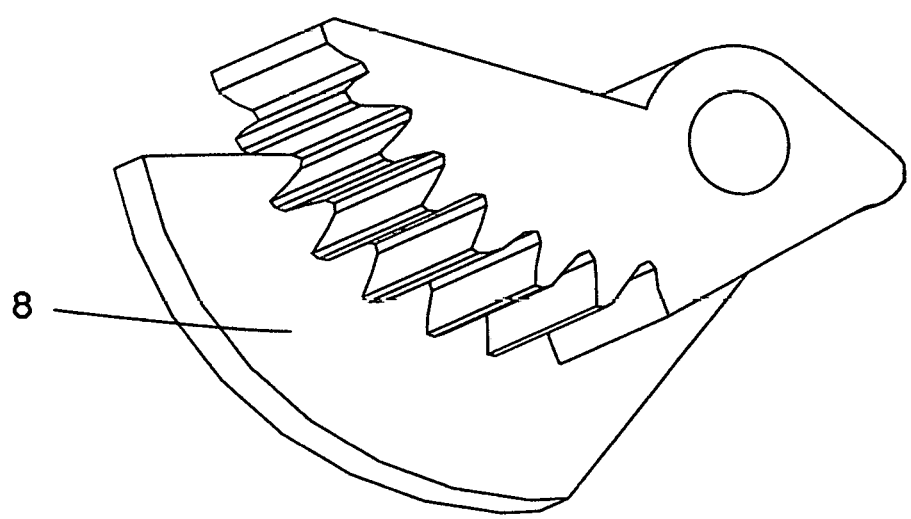
FIGS. 5B and 5C are perspective views illustrating alternative cam designs with the retaining ridge but without the secondary gripping teeth, according to an embodiment.
Figure 5C:
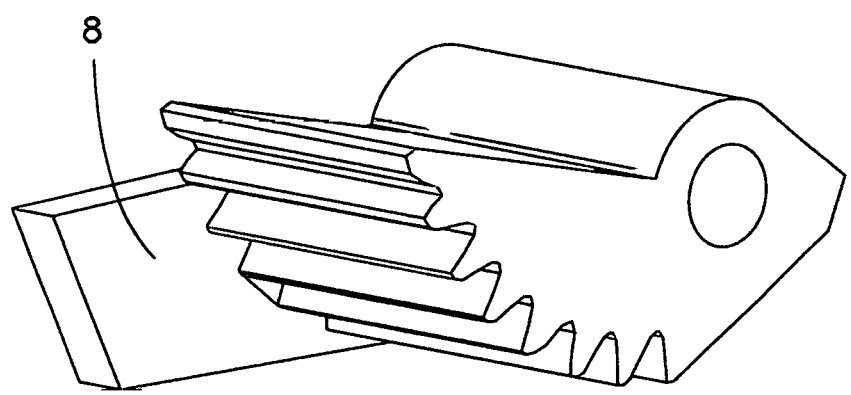
Figure 11A:
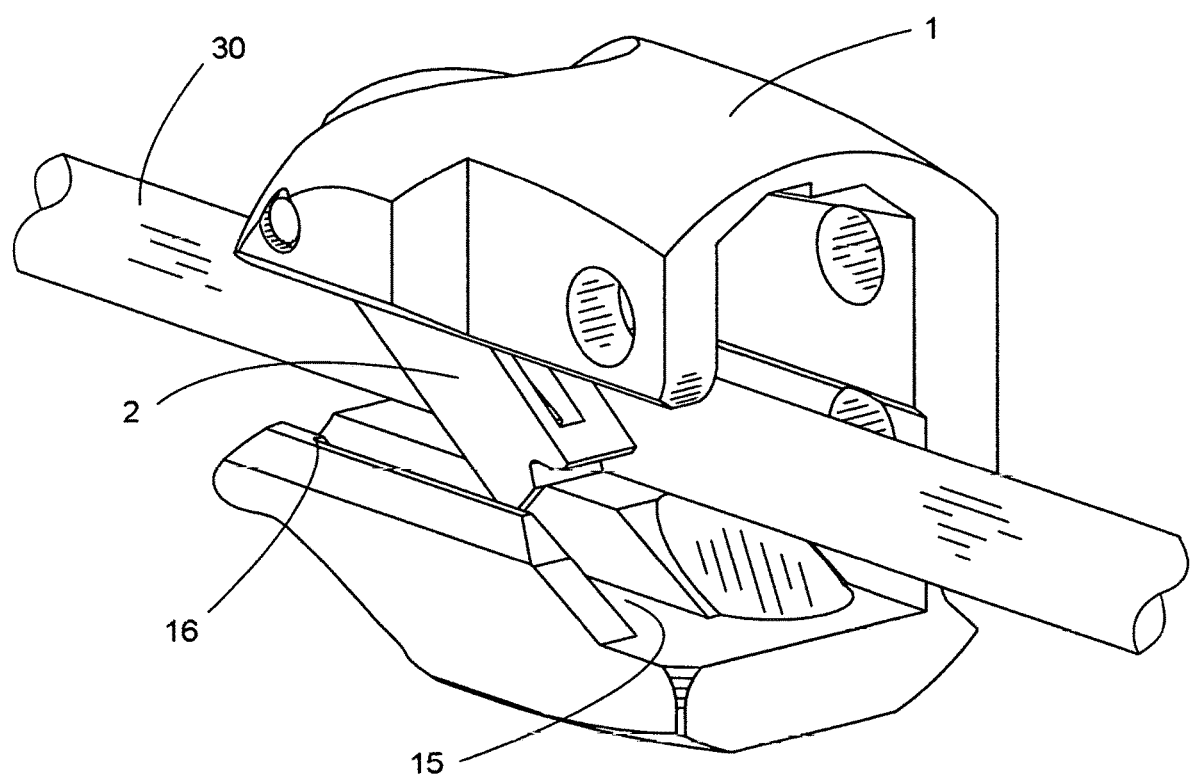
FIG. 11A is a back-side perspective view illustrating the rope retained in the channel with the cam retaining ridge interlocked in the retention groove, according to an embodiment.
Figure 11B:
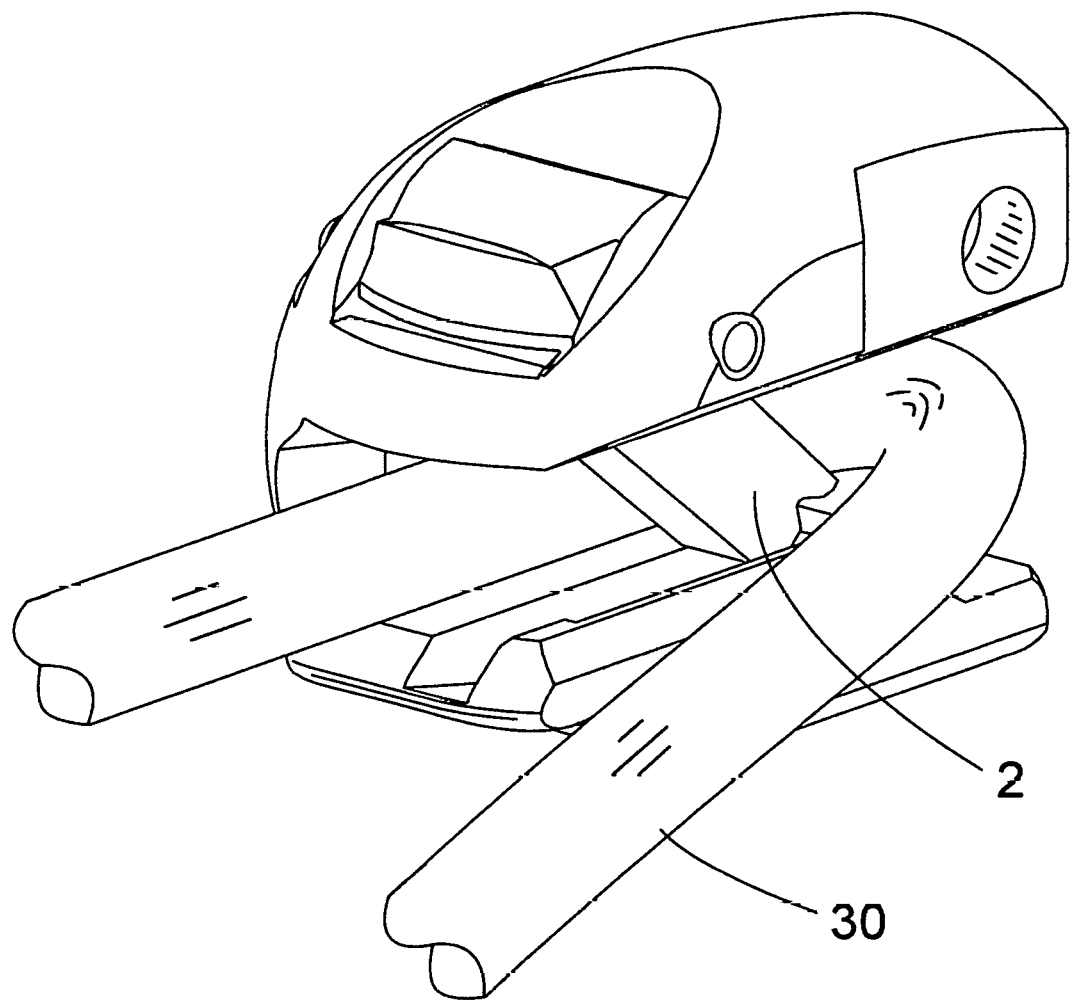
FIG. 11B is a drawing illustrating a rear of the rope being pulled to the side/front of the apparatus, according to an embodiment.

As the cam 2 rotates from the open (loading) position toward the closed position, the cam's unique built-in retaining ridge 8 (which is a protrusion that can either be molded onto the cam 2 (integrated) or attached via screw or other attachment mechanism to the cam 2) and is on a larger swing radius than the primary gripping teeth 6 (as illustrated in various configurations in FIG. 5A to 5C) swings downward and keeps the rope 30 retained in the gripping channel 5. Thus, when the cam's primary gripping teeth 6 are in contact with the rope 30, the rope 30 is encapsulated on four sides by the retaining ridge 8, side wall of the body 1, inside ceiling of the body 1, and bottom surface of the gripping channel 5 as shown in FIG. 8E. This retaining ridge 8 acts to keep the rope 30 contained inside the gripping channel 5. Also, if a user or some other force (e.g., gravity, wind, or some other object, etc.) either accidentally or purposely, pulls the rope 30 (the portion exiting the backside of the device as shown in FIG. 11B) towards the side or to the front of the device, the rope will contact the cam's 2 retaining ridge 8 and further cause the cam 2 to rotate into the rope 30 and grip harder (i.e., the rope cannot be disengaged from the device by pulling on the portion of the rope that exits the back.) The cam's retaining ridge 8 prevents inadvertent dislodging of the rope 30 and is automatically deployed by virtue of integration into the cam 2, eliminating the need for other mechanisms of retention (keeping the rope 30 inside the rope gripper) which may require flipping a lever, setting a pin, threading or weaving of a rope through an orifice or conduit on body, or any other means. Note that the cam 2 is integrated (fixedly attached) with the retaining ridge 8, primary gripping teeth 6, secondary gripping teeth 7, so that the retaining ridge 8, primary gripping teeth 6, secondary gripping teeth 7 must always move together.

Also, as the cam 2 rotates, the cam's retaining ridge 8 rotates into the retention groove 15 at a certain point along the rotating arc and creates a lateral interlocking condition as shown in FIG. 6, 9, 10A, 10B, 11A, 11B that helps to absorb any excessive lateral (side) forces the rope 30 may exert on the cam's retaining ridge 8.

Figure 7:
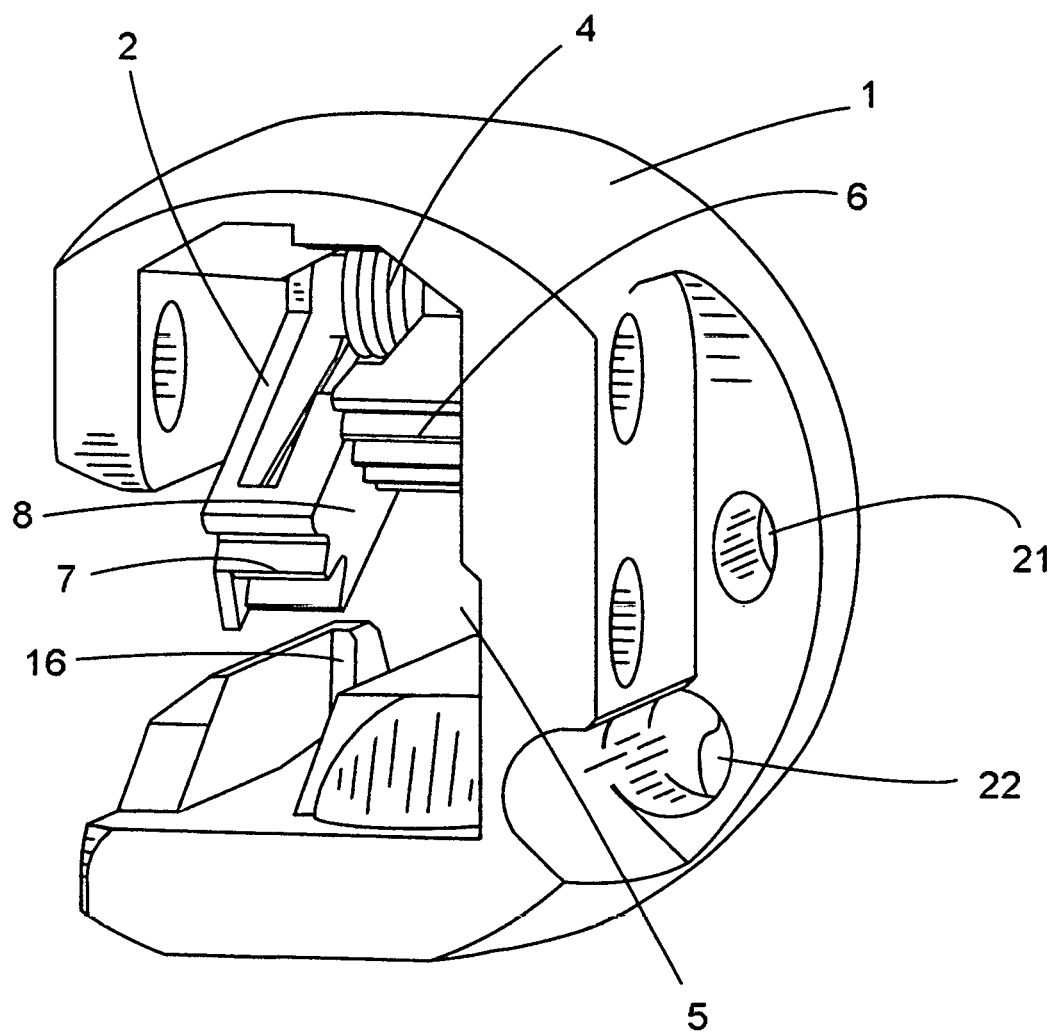
FIG. 7 is a perspective back-side view illustrating the cam in a partially closed position, according to an embodiment.

Also in the embodiment as shown in FIGS. 5A and 7, there is a set of secondary gripping teeth 7 designed into the outer periphery of the retaining ridge 8 that can be used to grip the smaller diameter rope 31 against the bottom surface of the retention groove 15 as shown in FIG. 2. The challenge of using one cam profile to successfully grip a large range of rope diameters is that you lose gripping power as the vertical angle between cam/rope contact point and the pivot point becomes too large. The larger the angle equates to less gripping power and more chance for rope slippage. The secondary gripping teeth 7 and retention groove 15 in this embodiment allows the proper angles between the cam/rope contact point and the pivot center point to effectively grip smaller diameter ropes 31 without slippage.

Figure 9:
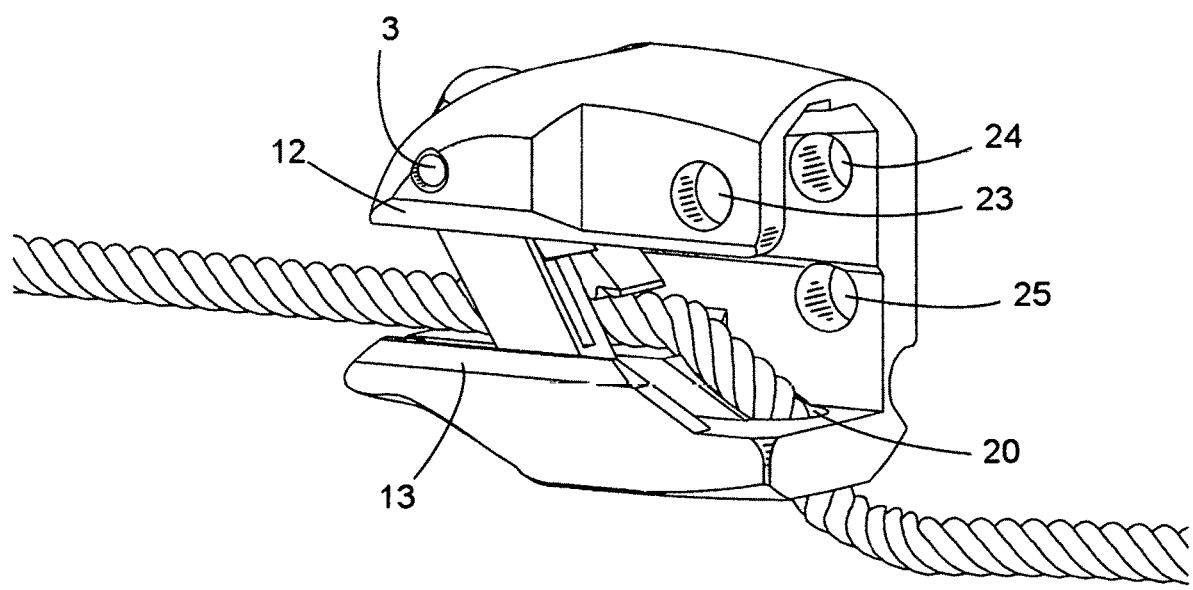
FIG. 9 is a side perspective view illustrating an optional configuration with the rope gripped in the main gripping channel and threaded through the rope orifice, according to an embodiment.

A rope 30 can be loaded into the gripping channel 5 by pressing the thumb lever 10 as shown in FIGS. 4A and 4B which rotates the cam 2 into the open (loading) position so the gripping channel 5 is exposed for receipt of the rope. Then, the user places the rope gripper around the rope 30 until the rope 30 is inside the gripping channel 5 and releases the thumb lever 10. If user has access to an end of the rope 30, then the end may be threaded through the rope orifice 20 as shown in FIG. 9 to prevent the rope gripper from falling off the rope 30 if the rope 30 should become dislodged from the gripping channel 5. This is an alternate configuration to the embodiment shown in FIG. 1, wherein the rope 30 passes through a rear of the body 1. Similarly, the smaller diameter rope 31 can be loaded into the retention groove 15 by pressing the thumb lever 10 which rotates the cam 2 into the open position so that the smaller rope 31 can be loaded into the retention groove 15 and then the thumb lever 10 can be released securing the smaller rope 31 inside the retention groove 15 by virtue of the secondary gripping teeth 7 pressing against the smaller rope 31.

Figure 10A:
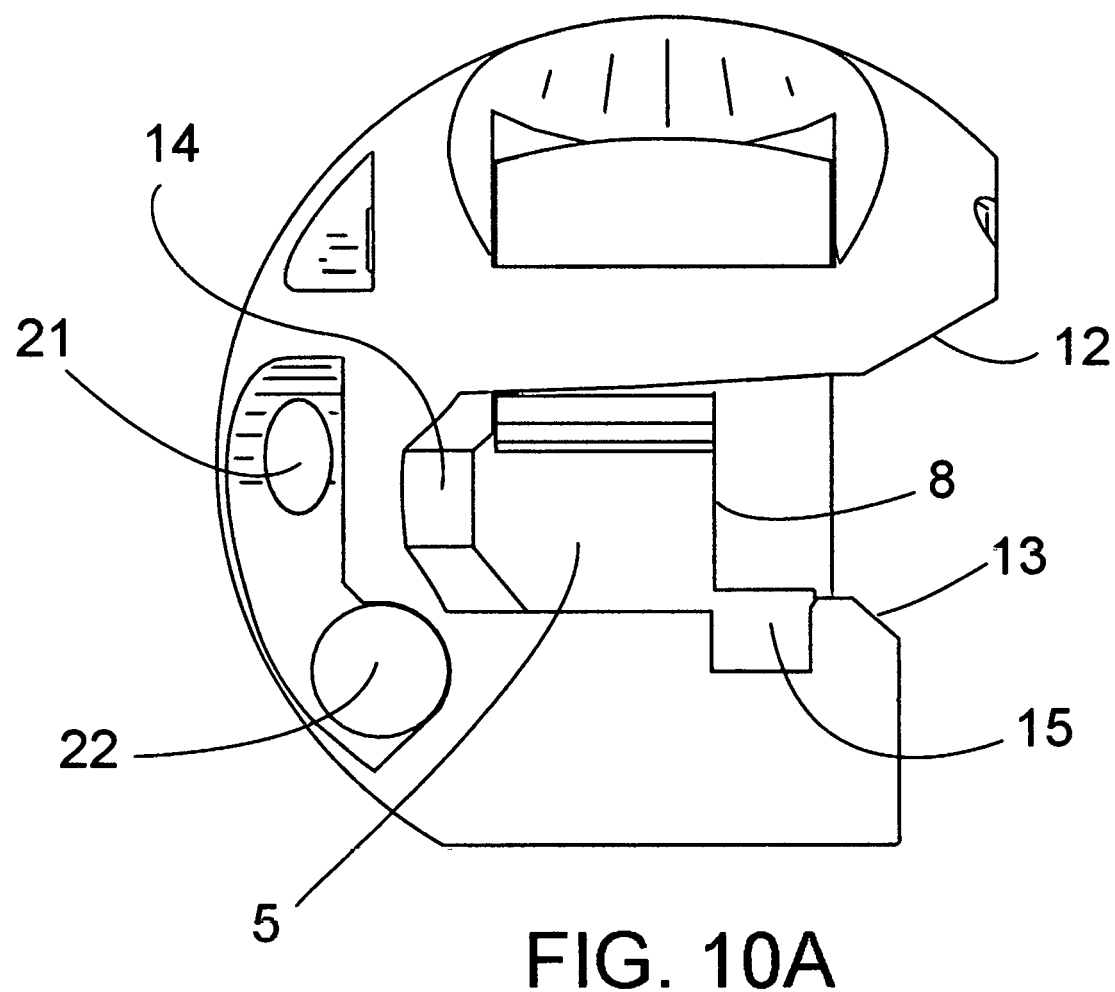
FIG. 10A is a front elevation view illustrating the cam in a partially closed position, according to an embodiment.
Figure 10B:
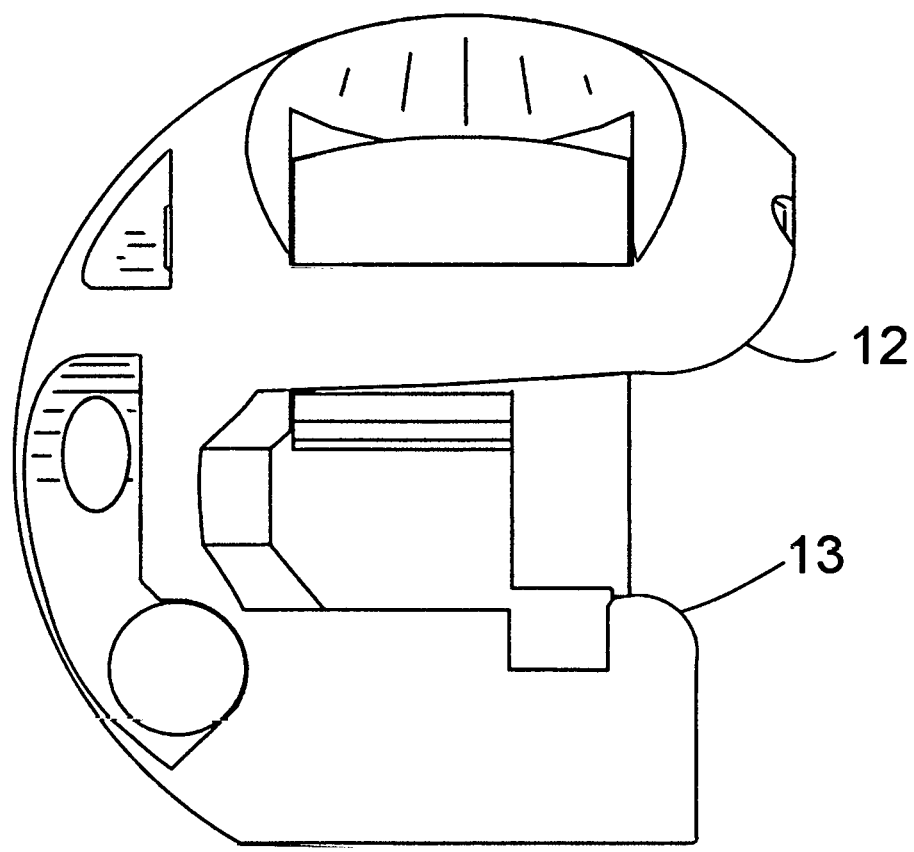
FIG. 10B is a front elevation view illustrating the cam in a partially closed position with alternative rounded lead-ins, according to an embodiment.

The rope 30 can also easily be loaded into the rope gripper without utilizing the thumb lever 10 in this embodiment as illustrated by the loading sequence in FIGS. 8A to 8E. This is accomplished by pulling the rope taut with the left hand against the tensile load. At this point, the rope gripper can be grabbed with the right hand and the user's thumb can be positioned on the top thumb rest 11. The user can wrap his pointer finger around the contoured finger grip 9 as shown in FIG. 6 which keeps one's fingers safely out of the moving rope zone and allows the user to firmly grasp the rope gripper. The open side of the gripping channel 5 can be positioned parallel with the rope 30 but with the front side slightly angled inward toward the rope 30 as shown in FIG. 8A. Note the top (upper lead-in 12) and bottom (lower lead-in 13) side walls of the channel openings (as shown in FIGS. 8E and 10A) are tapered toward the center of the gripping channel 5 in this embodiment, to allow the user to easily guide the rope 30 into the gripping channel 5 on the fly. Note that (as shown in FIGS. 8E and 10A) the upper lead-in 12 is at an upward angle (slanted upwards) and the lower lead-in 13 is at a downward angle (slanted downwards) which would make it easier to guide a rope 30, 31 into the gripping channel 5. For reference purposes, it can be considered that the upper lead-in 12 is at an upward angle (counter-clockwise direction but less than 90 degrees) relative to an angle orthogonal to the closed cam 2 (or the side of the body), and the lower lead-in 13 is at a downward angle (clockwise direction but less than 90 degrees) relative to an angle orthogonal to the closed cam 2 (or the side of the body). Another way of describing the upper lead-in 12 and the lower lead-in 13, is that there is an outer side of the body 1 on a side of the body 1 opposite the attachment aperture 25, the outer side comprising both an upper outer side and a lower outer side. The upper lead-in 12 is at an angle from the outer side that slants down and towards the center of the gripping channel 5, and the lower lead-in 13 is at an angle from the outer side that slants up and towards the center of the gripping channel 5. The upper lead-in 12 and the lower lead-in 13 are both not orthogonal to the outer side. Note that in an alternative embodiment, the upper lead-in 12 and the lower lead-in 13 could be rounded (as shown in FIG. 10B) which would serve the same purpose as the tapered upper lead-in 12 and lower lead-in 13 described herein.

At this point, the rope gripper can be pushed forward with a lateral bias towards the rope 30, forcing the rope 30 against the leading edge of the cam 2 (going against the force of the cam 2). The forward position of the cam's pivot point (dowel pin 3) relative to the body 1 allows the rope 30 to have constant contact with the cam 2 throughout the slightly angled loading sequence without interference from the channel's side wall. Also, the front channel wall 14 section shown in FIG. 6 is flared out to assure the rope has unimpeded contact with the cam 2 throughout the slightly angled loading process.

Note that the flared out front channel wall 14 is at a positive angle (less than 90 degrees) relative to the side (inner side) of the body as shown in FIG. 7. In other words, looking from the top down, the angle of the flared out front channel wall 14 turns clockwise (less than 90 degrees) relative to the line (plane) of the side of the body where the flared out front channel wall 14 connects to. In other words, instead of the side of the body being straight, at the intersection of the body and the flared out front channel wall 14 the flared out front channel wall 14 angles outward from the cam 2. The taper (angle) of the front channel wall 14 can assist the rope 30 to be loaded inside the gripping channel 5 without the user pressing on the thumb lever 10 (as described herein). Of course, the thumb lever 10 can also be pressed (opening the cam 2) if the user wants to load the rope 30 inside the gripping channel 5 (once the rope 30 is loaded, the user can release the thumb lever 10 thereby closing the cam 2).

The continued application of force against the front of the cam 2 by the rope 30 causes the cam 2 to rotate further toward the open position as shown in FIGS. 8C and 8D. Once the cam rotates far enough, the user can continue to move the rope gripper towards the rope 30 until the rope 30 passes under the cam 2 and snaps into the gripping channel 5. At this point, the cam's primary gripping teeth 6 clamps down on the rope 30 as shown in FIG. 8E and the loading process is complete with the rope 30 secured inside the rope gripper.

Once the rope 30 is fully inside the gripping channel 5, the natural force of the spring 4 (also referred to as torsion spring) causes the cam 2 to close. The primary gripping teeth 6 contacts the rope 30 and grips the rope 30 inside the gripping channel 5. Note that the closed position of the cam 2 with a rope 30 (or 31) inside is not completely closed (as the cam 2 would be in the closed position without a rope inside). This is because when a rope 30 is inside the gripping channel 5, the primary gripping teeth 6 contact the rope 30 thereby preventing the cam 2 from closing any further. When a rope 31 is inside the retention groove 15, the secondary gripping teeth 7 contact the rope 31 thereby preventing the cam 2 from closing any further.

Once a rope 30, 31 has been positioned and gripped (secured) inside the gripping channel 5 or the retention groove 15, respectively, the user can then use the rope gripper to pull the rope 30, 31 with a better grip than if the user was pulling the rope 30, 31 by itself with one's hands. The user can pull the rope 30, 31 (which typically would be under a tensile load from the front side of the device.) This can be accomplished by pulling the rope gripper ("backward stroke") (e.g., towards the right side of FIG. 11 which is towards the user). This backward stroke action allows the cam 2 to grip the rope 30, 31 as the cam 2 wants to naturally rotate towards the closed position and, as such, grip tighter on the rope 30, 31.

When the rope gripper is pulled closer to the user, the user can then hold the rope 30, 31 with one hand (e.g., the user's left hand) while sliding the rope gripper away from the user (forward) with the user's right hand ("forward stroke"). Note that in an embodiment, when the rope gripper is pushed in the direction towards the front of the rope gripper (e.g., the left side of FIG. 11 which is away from the user), then the rope gripper can freely slide forward (as opposed to gripping it) along the rope 30 and/or smaller diameter rope 31 (this is due to the sliding force can overcome the force of the torsion spring 4).

In other words, in an embodiment, as one is progressively pulling a tensile load, the rope gripper can continually be repositioned further forward along the tensioned rope 30, 31 simply by holding the rope emerging from the back side of the rope gripper and then sliding the rope gripper forward (forward stroke) along the rope toward the tensile load. The rope 30, 31 slides freely in the channel when the gripper is pushed forward along the rope 30, 31, but grips the rope 30, 31 when pulled away (backward stroke) from the load or tension. In this manner, the user can repeatedly perform a backward stroke (rope 30, 31 cannot slide through the rope gripper), a forward stroke (rope 30, 31 slides through the rope gripper), a backwards stroke (rope 30, 31 cannot slide through the rope gripper), a forward stroke (rope 30, 31 slides through the rope gripper), etc., as many times as needed in order to consistently act on the desired load.

To release the rope 30, 31 from the rope gripper, the user can grab the tensioned portion of the rope 30, 31 (part emerging from the front of the rope gripper) and pull it backwards against the cam 2 until the cam 2 opens and the rope 30, 31 is freed (released) from the gripping channel. Also, the thumb lever 10 can be pressed at any time to remove the rope 30, 31 from the rope gripper.

In this embodiment the device can act as a rope clamp in which a variety of objects (not shown but include boat fenders, anchors, flags, etc. . . . ) may be tied or clipped to the rope gripper through various orifices 20, 22, 23, 24, 25, as shown in FIGS. 9 and 10A, and hung from a rope 30, 31. In most cases, gravity acts on the objects being hung and provides the force against the cam 2 to allow it to grip the rope 30, 31. The device, and thereby any objects attached to it, may easily be positioned and repositioned anywhere along the rope 30, 31 by sliding the rope gripper along the rope 30, 31. To move device and objects up the rope simply grab the rope 30, 31 on the bottom side of the device and slide the rope gripper upwards. To move the device down the rope 30, 31 (towards the object), you must press the thumb lever 10 first to release the cam's grip from the rope 30, 31.

Two of the orifices in an embodiment, a left pivot pin hole 23 and a right pivot pin hole 24 are axially aligned so they can be used to attach an external dowel (or pin) or other attachment mechanism through both holes which could allow the rope gripper to be affixed to a pin (or dowel) and allow it to swivel in one plane. This allows the device the ability to swivel if affixed to a solid structure and the device can thereby be used as a ratchet device.

The body can have several orifices 20, 22, 23, 24, 25 used as attachment points for a variety of objects. A channel wall attachment orifice 25 (or any of the orifices 20, 22, 23, 24) can be used to attach the rope gripper to an external device. Attachments can be made via screws, friction fit, adapted dowels/rods, or any other attachment mechanism. The rope orifice 20 can be used to feed a rope 30 through for a more secure attachment to the rope 30 or can simply be used as another attachment point for a variety of objects. The rope gripper can also have a wrist strap orifice 21 as shown in FIG. 10A used for attachment of a breakaway wrist strap. An optional floating mechanism (not shown) could also be attached to the wrist strap orifice 21 which would allow the rope gripper to float in case it fell in water.

Figure 12:
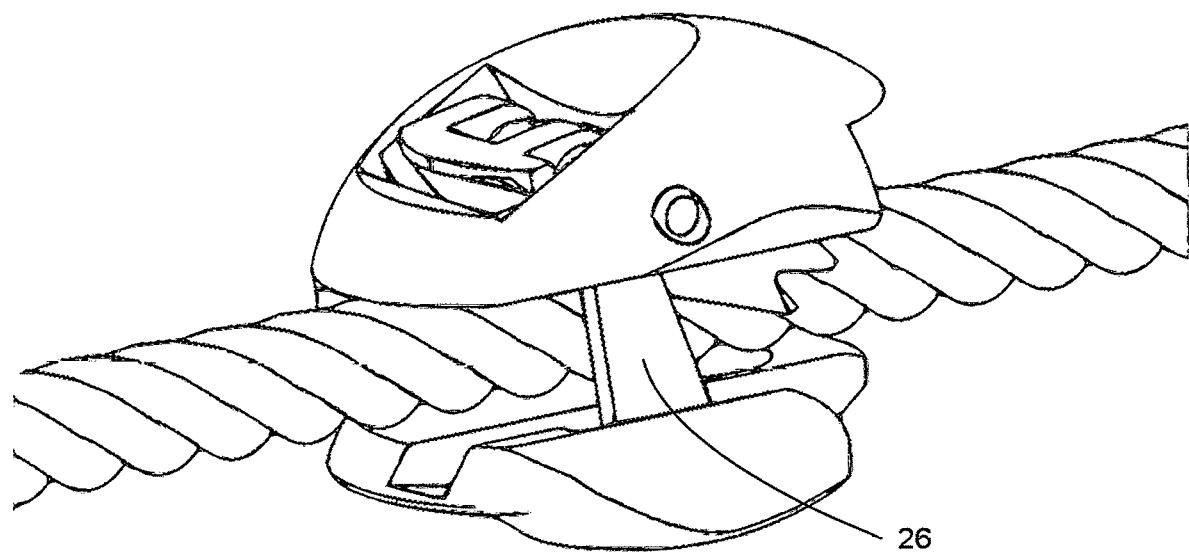
FIG. 12 is a perspective view illustrating an optional spring loaded retaining arm, according to an embodiment.
Figure 13:
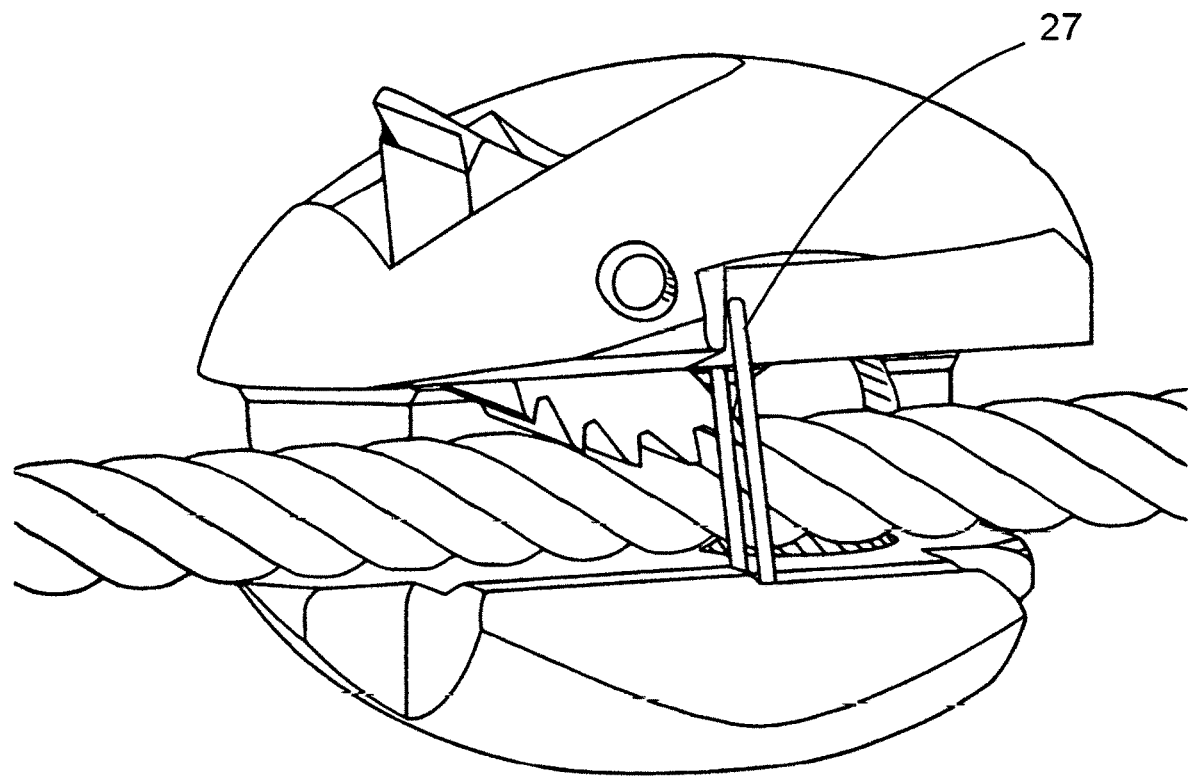
FIG. 13 is a perspective view illustrating an optional carabiner style retaining gate, according to an embodiment.

FIGS. 12 and 13 show optional configurations which would utilize a separate spring loaded retention arm 26 (FIG. 12) which is separate from the cam 2, or a hinged carabiner style gate 27 (FIG. 13) which is also separate from the cam 2. Both the arm 26 and the gate 27 are shown in their respective closed position. Both the arm 26 and the gate 27 act independently of the cam 2 to capture (retain) the rope 30 inside the gripping channel 5 when in the gripping position. The arm or gate both have an open and closed position and can have a mechanism to be opened to allow receipt of rope 30 into the gripping channel 5.

Figure 14:
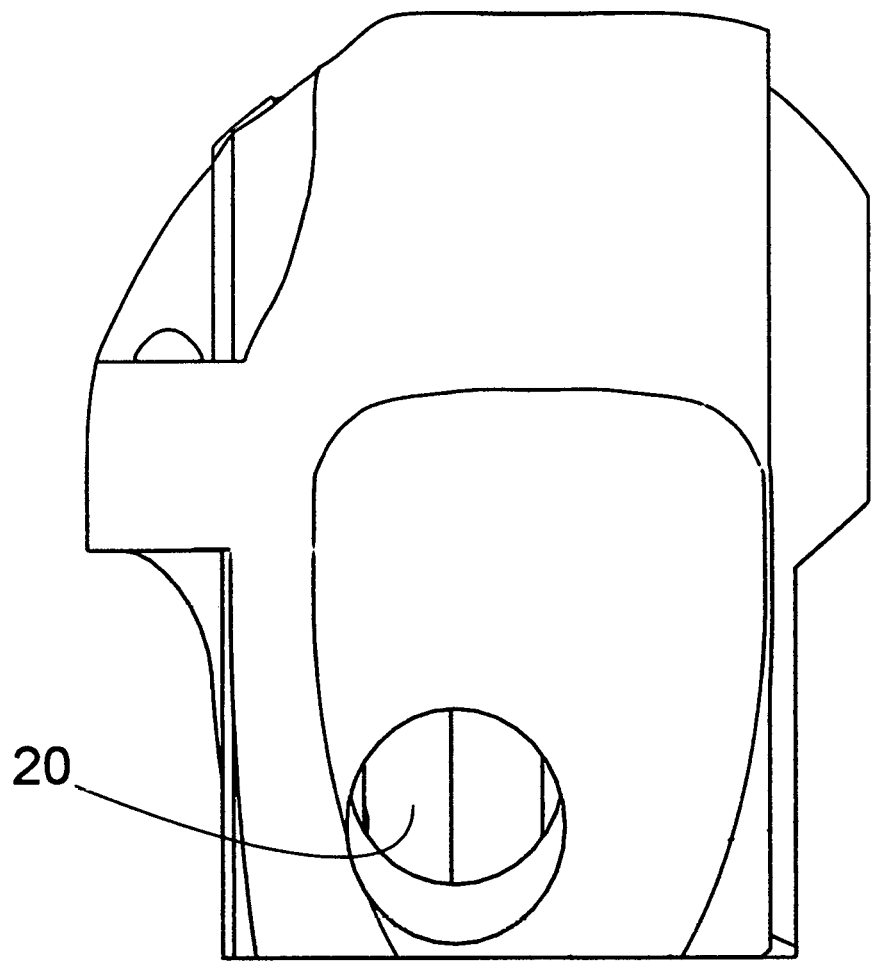
FIG. 14 shows a bottom view of the rope gripper, according to an embodiment.
Figure 15:
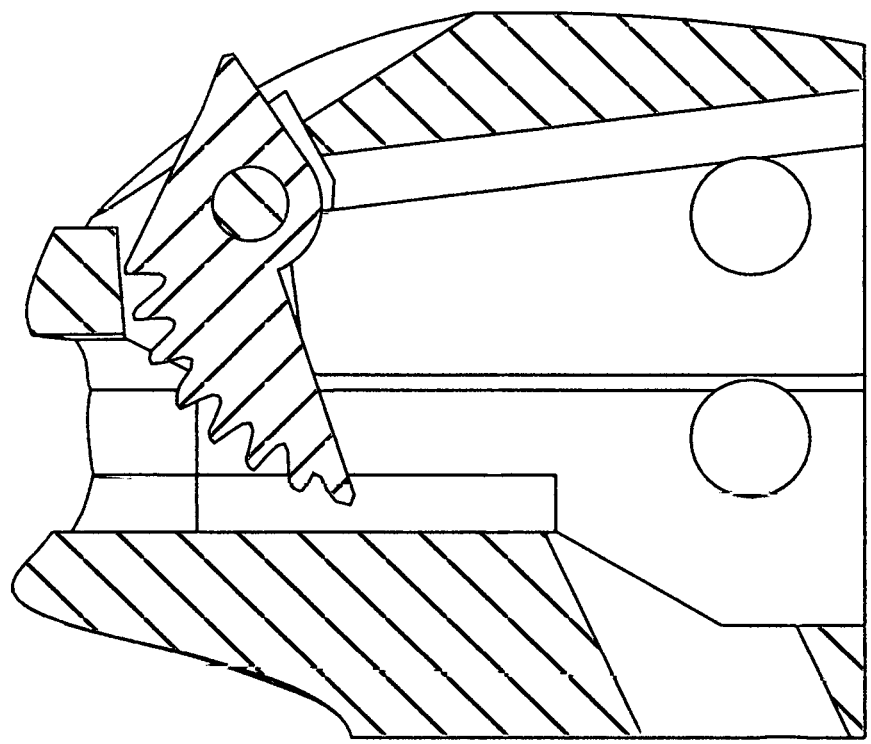
FIG. 15 is a cutaway view illustrating the cam in a closed position, according to an embodiment.
Figure 16:
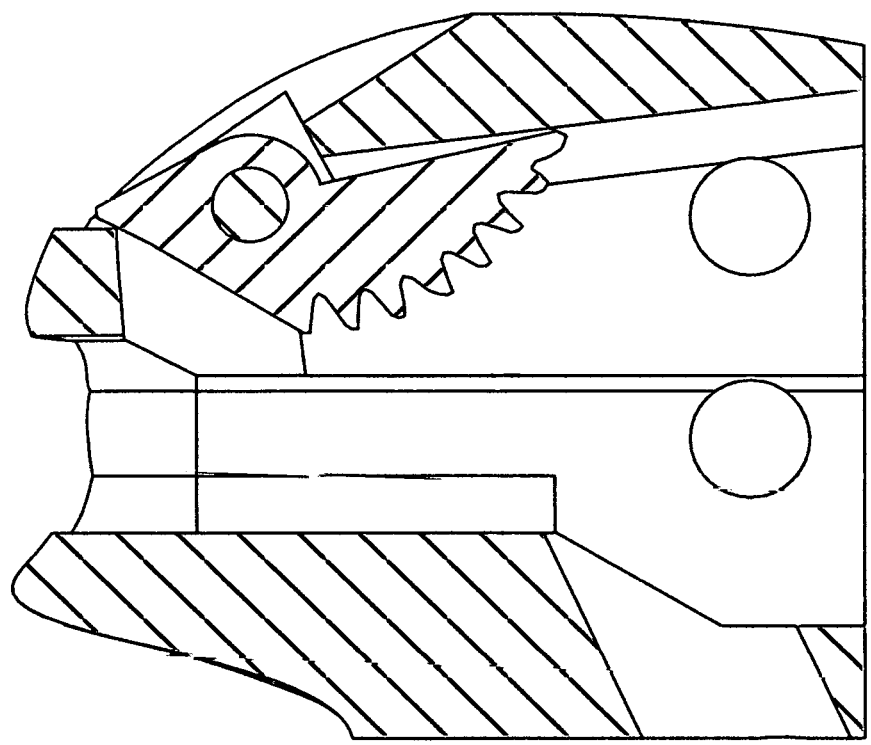
FIG. 16 is a cutaway view illustrating the cam in an open position, according to an embodiment.

The rope gripper can also have a flat back side and flat bottom (as shown in FIG. 14-16) so it can lay on a flat surface without rolling away, or it can lay flat with the opening to the gripping channel 5 facing down.

Advantages of the inventive concept are as follows. The rope gripper is a hand held cam/cleat device. The body is ergonomical and has a contoured thumb rest 11 and finger grip 9, which gives leverage to the pulling action and keeps the user's fingers out of moving rope zone, thereby reducing risk of rope burn.

The cam 2 is configured with a retaining ridge 8 (built into the open-ended side of the cam as it sits in the gripping channel 5) to keep the rope 30 captured in the gripping channel 5 and co-planar with the cam's 2 gripping surface. It also allows the rope 30 to positively snap into the gripping channel 5 when loading.

The cam 2 has dual gripping profiles, in which one is used to effectively grip larger diameter ropes 30 in the gripping channel 5 and another one used to effectively grip smaller diameter ropes 31 in the retention groove 15. This dual cam setup allows the gripper to grip a wider range of rope diameters without slippage.

The cam's retaining ridge 8 interlocks in the retention groove 15 to provide additional lateral support for the cam 2 as the rope 30 exerts lateral force on the cam 2. The cam 2 has an integrated thumb lever 10 to open/close cam and allow lateral (side) receipt/removal of rope 30, 31.

The cam's 2 pivot point (dowel pin 3) is positioned toward the front of the device which allows the rope 30 to stay in contact with the cam 2 without interference from the side channel wall as the rope is being angled into the rope gripper. The cam stop 16 is a physical hard stop built into the body to prevent over-rotation of the cam 2 which could lead to a potential locking condition if the rope/cam teeth contact point is pulled forward of the pivot point.

The front channel wall 14 is flared out in the front to assure rope has unimpeded contact with the cam 2 throughout the angled loading process. Channel openings are tapered or rounded (the upper lead-in 12 and the lower lead-in 13) to allow one to easily locate and guide the rope 30 into the gripping channel 5.

If a rope 30 is inside the gripping channel 5 (between the retaining ridge 8 and an inside wall of the body 1), and the rope gripper is pulled in a backward direction, (backwards stroke, toward the user, away from a weighted object tied to a front of the rope 30) the primary gripping teeth 6 would initially press against the rope 30 due to force from the spring 4 but as the rope 30 is pulled further and the primary gripping teeth 6 have engaged enough surface of the rope 30, the mechanical force of the rope acting on the primary gripping teeth 6 causes the primary gripping teeth 6 (and hence the cam 2) to rotate further towards the closed position. This motion, in turn provides enough mechanical force to grip the rope 30 and prevent the rope 30 from sliding inside the gripping channel 5 thereby pulling on the object (which can be heavy and weigh more than one pound) tied to a front of the rope 30. In a reverse (opposite) direction, utilizing a forward direction (forward stroke) can cause the rope 30 to slightly lift and rotate the primary gripping teeth 6 (and hence the cam 2) towards the open position. This can allow the rope 30 to slide through the rope gripper (which is the same as saying the rope gripper would slide along the rope 30) during a forward stroke. Similarly, the physical gripping action on a smaller diameter rope 31 in the retention groove 15 is the same as it is with the larger diameter rope 30 although it is the secondary gripping teeth 7 that press against the rope 31 in this configuration. Although note that in an alternate embodiment, the griping mechanism on the rope 30, 31 would be so tight that a forward stroke would not enable the rope to slide through the rope gripper. The rope gripper can be subject to a variety of other uses, such as clamping objects to a line, tightening cargo straps, hoisting lanyards, moving weighted objects, pulling any sort of line taut, etc. Its use is not limited by the examples provided herewith.

Figure 17:
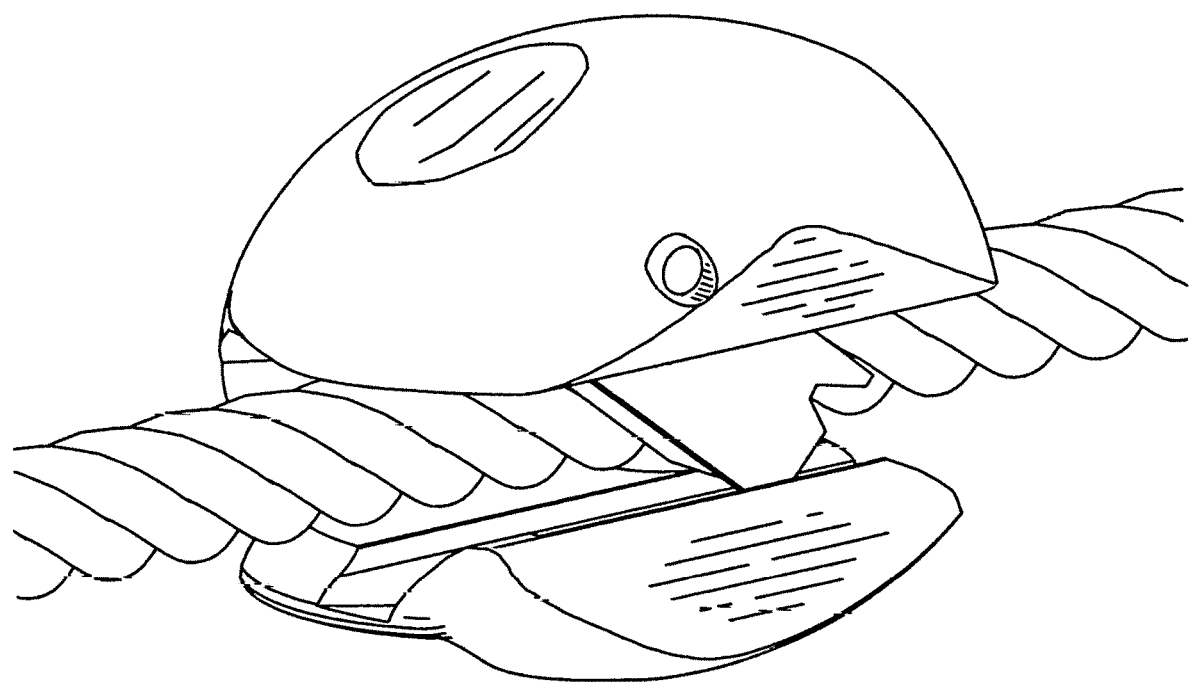
FIG. 17 is a drawing illustrating an embodiment in which there is no thumb lever, according to an embodiment.

In an embodiment, the thumb lever 10 can be optional. In this embodiment, the rope 30 can be loaded using the loading method as described herein which does not require the thumb lever 10 to open the cam 2. FIG. 17 illustrates this embodiment in which there is no thumb lever (or any type of lever) to operate the cam 2, as the cam 2 in FIG. 17 is opened and the rope is loaded by way of positioning the rope 30 to manually push open the cam 2 (as described herein), and after the rope 30 is loaded the cam 2 will automatically close due to force of the spring 4.

The entire apparatus (the "device" and "apparatus" are used synonymously herein) described herein (including all of its parts) can be made of any combination of suitable materials, for example (but not limited to) hard plastic, aluminum, steel, etc. If made from plastic the different parts can be made by injection molding. The apparatus can also be made from 3-D printing, etc. Certain parts, (such as the spring, etc.) should be made from standard materials for such parts (e.g., hardened steel for springs). Parts that are integrated together can be manufactured that way or adhered together (e.g., using an adhesive, etc.) In addition, the apparatus (and its parts) can be made of any suitable size. For example, the length (from left to right in FIG. 15) can be 2.5 inches, the height (from top to bottom in FIG. 15) can be 1.5 inches, the width (from left to right in FIG. 14) can be 1.5 inches. The size of other parts can be to scale of what is shown in the Figures. Note, however, that other sizes of the apparatus can constructed and one of ordinary skill in the art can appreciate that the apparatus is not limited to these particular dimensions or proportions (e.g., the apparatus can be manufactured which is proportionally wider, and/or longer and/or taller than the proportions shown). In addition, parts and recesses can be any suitable size and limited to the scale shown or proportions illustrated herein.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A rope gripper apparatus, comprising:
a body;
a cam configured to rotate inside the body into an open position and a closed position, the cam comprising an integrated retaining ridge which moves together with the cam, the cam comprising primary gripping teeth and secondary gripping teeth; and
a spring configured to naturally push the cam toward the closed position;
gripping channel located throughout the body, wherein the primary gripping teeth are configured to grip in the gripping channel; and
a retention groove located throughout the body, wherein the secondary gripping teeth are configured to grip in the secondary gripping channel, the retention groove configured to house a smaller diameter rope than that gripping channel.

2. The apparatus as recited in claim 1, wherein the body further comprises an outer side comprising a lower lead-in which slants upwards.

3. The apparatus as recited in claim 2 wherein the outer side further comprises an upper lead-in which slants downwards.

4. The apparatus as recited in claim 3, wherein the body further comprises an inner side of the body and a flared out front channel wall connected to the inner side.

5. The apparatus as recited in claim 1, wherein the body further comprises an outer side comprising an upper lead-in which is rounded.

6. The apparatus as recited in claim 5, wherein the body further comprises an outer side comprising a lower lead-in which is rounded.

7. The apparatus as recited in claim 6, wherein the body further comprises an inner side of the body and a flared out front channel wall connected to the inner side.

8. The apparatus as recited in claim 1, wherein the body further comprises an outer side comprising an upper lead-in which slants downwards.

9. The apparatus as recited in claim 8, wherein the body further comprises an inner side of the body and a flared out front channel wall connected to the inner side.

10. The apparatus as recited in claim 1, wherein the retention groove comprises a recessed groove on a floor of a bottom surface of a main channel in the body.

11. The apparatus as recited in claim 10, wherein the apparatus is configured such that when the cam is biased towards the closed position with no rope present inside the body, the cam extends into the retention groove.

12. The apparatus as recited in claim 1, further comprising: a thumb lever connected to the cam, the thumb lever configured such that when pressed, causes the cam to swing into the open position against force of the spring.

13. The apparatus as recited in claim 1, wherein the body further comprises an inner side of the body and a flared out front channel wall connected to the inner side.

14. The apparatus as recited in claim 1, further comprising a rope orifice in a floor of the body.

15. The apparatus as recited in claim 1, wherein a first leg of the spring fits inside the cam and a second leg of the spring rests on a roof of a ceiling inside the body.

16. A method, comprising: providing a rope gripper apparatus comprising:
a body; a cam configured to rotate inside the body into an open position and a closed position, the cam comprising an integrated retaining ridge which moves together with the cam; the cam comprising primary gripping teeth and secondary gripping teeth, a spring configured to naturally push the cam toward the closed position, a gripping channel located throughout the body, wherein the primary gripping teeth are configured to grip in the gripping channel, and a retention groove located throughout the body, wherein the secondary gripping teeth are configured to grip in the secondary gripping channel, the retention groove configured to house a smaller diameter rope than the gripping channel;
loading a rope inside the rope gripper apparatus; and
performing a forward stroke and a backward stroke with the rope gripper apparatus.

* * * * *